US010103796B2

(12) United States Patent
Levy et al.

(10) Patent No.: US 10,103,796 B2
(45) Date of Patent: Oct. 16, 2018

(54) APPARATUS, SYSTEM AND METHOD OF SELECTIVELY RESPONDING TO WIRELESS TRANSMISSIONS

(71) Applicant: INTEL IP CORPORATION, Santa Clara, CA (US)

(72) Inventors: Elad Levy, Rishon LeZion (IL); Tom Harel, Shefayim (IL); Michael Glik, Kfar Saba (IL); Igor Brainman, Kfar Saba (IL); David Gabay, Rishon Letzion (IL); Paz Pentelka, Netanya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 85 days.

(21) Appl. No.: 15/039,553

(22) PCT Filed: Dec. 27, 2013

(86) PCT No.: PCT/US2013/077902
§ 371 (c)(1),
(2) Date: May 26, 2016

(87) PCT Pub. No.: WO2015/099750
PCT Pub. Date: Jul. 2, 2015

(65) Prior Publication Data
US 2017/0026099 A1 Jan. 26, 2017

(51) Int. Cl.
*H04W 72/04* (2009.01)
*H04B 7/06* (2006.01)
*H04B 7/08* (2006.01)

(52) U.S. Cl.
CPC ......... *H04B 7/0619* (2013.01); *H04B 7/0617* (2013.01); *H04B 7/0695* (2013.01); *H04B 7/088* (2013.01)

(58) Field of Classification Search
CPC ...... H04B 7/06; H04B 7/0619; H04B 7/0617; H04W 72/04; H04W 74/08
See application file for complete search history.

(56) References Cited

U.S. PATENT DOCUMENTS

| 8,699,608 | B2 * | 4/2014 | Yamaura | H04B 7/0421 375/260 |
| 2008/0110263 | A1 * | 5/2008 | Klessel | G01S 7/52028 73/602 |

(Continued)

FOREIGN PATENT DOCUMENTS

EP 1641180 3/2006

OTHER PUBLICATIONS

International Preliminary Report on Patentability for PCT/US2013/017902, dated Jul. 7, 2016, 8 pages.

(Continued)

*Primary Examiner* — Wei Zhao
(74) *Attorney, Agent, or Firm* — Shichrur & Co.

(57) ABSTRACT

Some demonstrative embodiments include apparatuses, systems and/or methods of selectively responding to wireless communication transmissions. For example, an apparatus may include a wireless communication unit to allocate at least one association beamforming training (A-BFT) period, to receive a responder beamforming transmission from a responder device during the A-BFT period, to transmit to the responder device a feedback transmission in response to the responder beamforming transmission, and to set a responder filtering period extending over one or more successive A-BFT periods, wherein the wireless communication unit is to ignore one or more responder beamforming transmissions from the responder device during the filtering period.

13 Claims, 6 Drawing Sheets

(56) References Cited

U.S. PATENT DOCUMENTS

| | | | |
|---|---|---|---|
| 2008/0204322 A1* | 8/2008 | Oswald | G01S 5/04 |
| | | | 342/465 |
| 2010/0103045 A1 | 4/2010 | Liu et al. | |
| 2010/0265925 A1 | 10/2010 | Liu et al. | |
| 2011/0064033 A1 | 3/2011 | Gong et al. | |
| 2012/0008603 A1* | 1/2012 | Chu | H04B 7/0617 |
| | | | 370/338 |
| 2012/0120892 A1* | 5/2012 | Freda | H04W 8/005 |
| | | | 370/329 |
| 2013/0044695 A1 | 2/2013 | Xu et al. | |
| 2013/0329712 A1 | 12/2013 | Cordeiro et al. | |

OTHER PUBLICATIONS

International Search Report and Written Opinion for PCT/US2013/077902, dated Sep. 23, 2014, 9 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wigig Wireless Gigabit Alliance, Wigig MAC and PHY Specification Version 1.1, Apr. 2011, 442 pages.

European Search Report for European Patent Application No. 13899995.8, dated Jul. 17, 2017, 12 pages.

\* cited by examiner

US 10,103,796 B2

APPARATUS, SYSTEM AND METHOD OF SELECTIVELY RESPONDING TO WIRELESS TRANSMISSIONS

TECHNICAL FIELD

Some demonstrative embodiments relate to selectively responding to wireless communication transmissions.

BACKGROUND

In Some communication systems, a controller device may transmit a beacon frame in order to define a beacon interval.

During the beacon interval the controller device may perform beamforming training with one or more other devices of the system. For example, the beacon interval may include an association beamforming training (ABFT) period, during which one or more other devices may respond to the controller device with a beamforming transmission, e.g., a sector sweep (SSW) transmission.

The controller device may receive a beamforming transmission from a responding device, and may transmit a SSW feedback transmission in response to the beamforming transmission, e.g., to complete the beamforming training procedure.

The controller device may exchange probe request and probe response transmissions with the responding device, e.g., subsequent to the beamforming training.

In dense environments including a plurality of devices, collision may occur during the ABFT, e.g., if all devices within the system respond to the beacon transmissions. Accordingly, the controller device may not be able to perform beamforming training with one or more of the devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
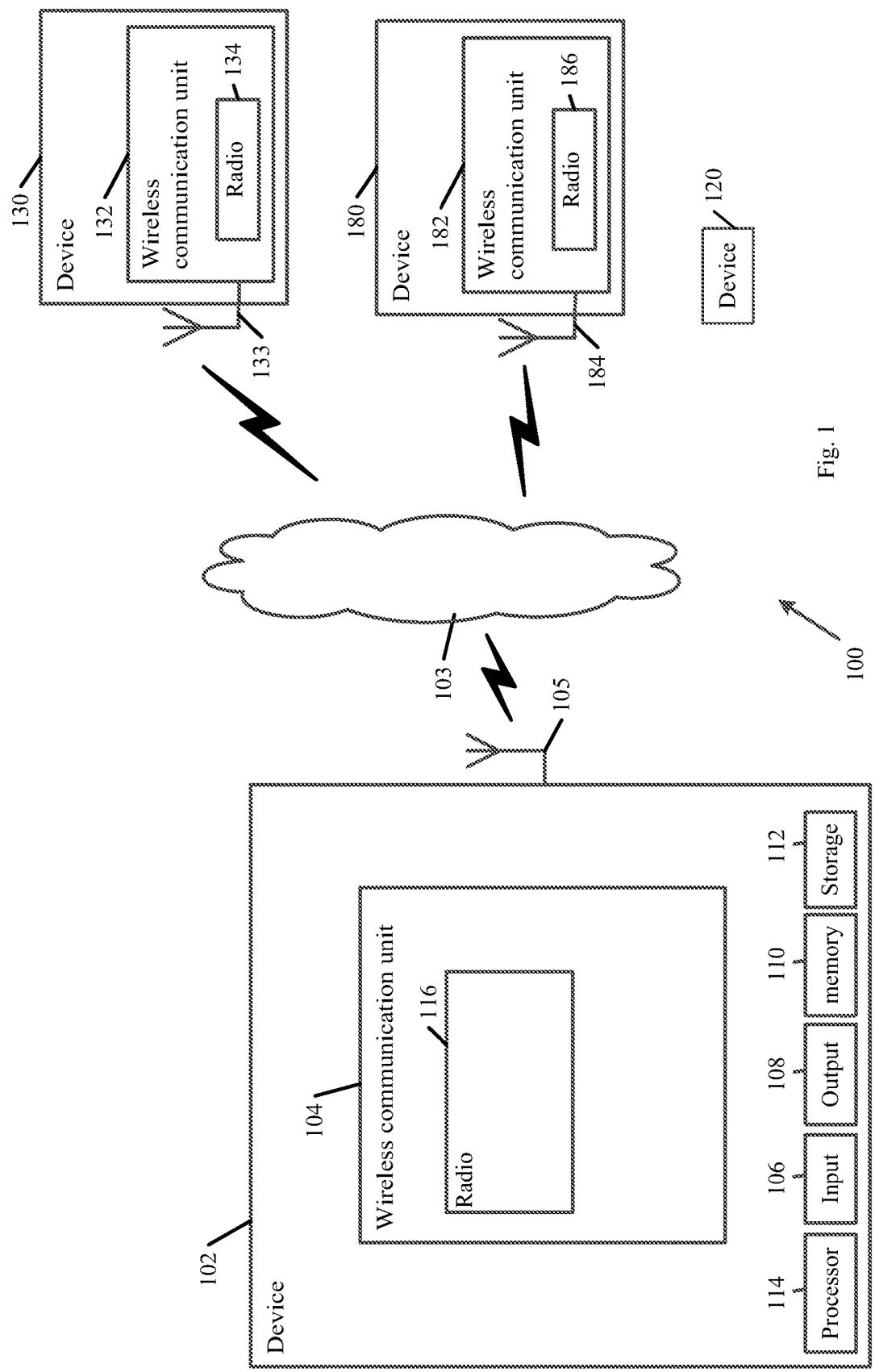
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing IEEE 802.11 standards (IEEE 802.11-2012, *IEEE Standard for Information technology—Telecommunications and information exchange between systems Local and metropolitan area networks—Specific requirements Part* 11: *Wireless LAN Medium Access Control (MAC) and Physical Layer (PHY) Specifications*, Mar. 29, 2012; IEEE802.11 task group ac (Tgac) ("IEEE802.11-09/0308r12—TGac Channel Model Addendum Document"); IEEE 802.11 task group ad (Tgad) (IEEE P802.11ad-2012, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the* 60 GHz Band, 28 Dec. 2012)) and/or future versions and/or derivatives thereof, devices and/or networks operating in accordance with existing WirelessHD™ specifications, and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification, version* 1.2, 2012), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "station" (STA), as used herein, may include any logical entity that is a singly addressable instance of a medium access control (MAC) and a physical layer (PHY) interface to a wireless medium (WM).

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "mmWave STA (STA)", as used herein, may relate to a STA having a radio transmitter, which is operating on a channel that is within the UB.

The phrase "personal basic service set" (PBSS), as used herein, may relate to a basic service set (BSS) that forms a self-contained network. For example, the PBSS may operate in the DBand, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The term "beamforming", as used herein, may relate to a spatial filtering mechanism, which may be used at a transmitter and/or a receiver to improve the received signal power or signal-to-noise ratio (SNR) at an intended receiver.

The phrase "Beacon interval", as used herein, may relate to a number of time units between target beacon transmission times.

The phrase "beacon transmission interval" (BTI), as used herein, may relate to a time interval between the start of a first beacon transmission by a STA in a beacon interval to an end of a last beacon transmission by the STA in the same beacon interval.

The phrase "association beamforming training" (A-BFT), as used herein, may relate to a time allocated for a STA, following the beamforming transmission, to respond to beacons transmitted during the BTI, e.g., using a sector sweep.

The term "sector", as used herein, may relate to a transmitter and/or a receiver antenna pattern corresponding to a particular sector, e.g., a sector identifier (ID).

The term "sweep", as used herein, may relate to a sequence of transmissions, e.g., separated by a short beamforming inter frame space interval, in which an antenna configuration at a transmitter and/or a receiver is changed between transmissions.

The phrase "sector sweep" (SSW), as used herein, may relate to a reception or a transmission of frames via different sectors, in which a sweep is performed between consecutive receptions and/or transmissions.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102, 130 and/or 180, capable of communicating content, data, information and/or signals over a wireless communication medium (WM) 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 130 and/or 180 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102, 130 and/or 180 may include wireless communication units 104, 132 and/or 182, respectively, to perform wireless communication between wireless communication devices 102, 130 and/or 180 and/or with one or more other wireless communication devices, e.g., as described below.

In some demonstrative embodiments, wireless communication devices 102, 130 and/or 180 may also include, for example, one or more of a processor 114, an input unit 106, an output unit 108, a memory unit 110, and a storage unit 112. Wireless communication devices 102, 130 and/or 180 may optionally include other hardware components and/or software components. In some demonstrative embodiments, some or all of the components of one or more of wireless communication devices 102, 130 and/or 180 may be enclosed in a common housing or packaging, and may be interconnected or operably associated using one or more wired or wireless links. In other embodiments, components of one or more of wireless communication devices 102, 130 and/or 180 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102, 130 and/or 180 and/or of one or more applications.

Input unit 106 includes, for example, a keyboard, a keypad, a mouse, a touch-screen, a touch-pad, a track-ball, a stylus, a microphone, or other suitable pointing device or input device. Output unit 108 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102, 130 and/or 180.

In some demonstrative embodiments, wireless communication units 104, 132 and 182 may include, or may be associated with, one or more antennas 105, 133 and 184, respectively. Antennas 105, 133 and/or 184 may include any type of antennas suitable for transmitting and/or receiving wireless communication signals, blocks, frames, transmission streams, packets, messages and/or data. For example, antennas 105, 133 and/or 184 may include any suitable configuration, structure and/or arrangement of one or more antenna elements, components, units, assemblies and/or arrays. Antennas 105, 133 and/or 184 may include, for example, antennas suitable for directional communication, e.g., using beamforming techniques. For example, antennas 105, 133 and/or 184 may include a phased array antenna, a single element antenna, a set of switched beam antennas, and/or the like. In some embodiments, antennas 105, 133 and/or 184 may implement transmit and receive functionalities using separate transmit and receive antenna elements. In some embodiments, antennas 105, 133 and/or 184 may implement transmit and receive functionalities using common and/or integrated transmit/receive elements.

In some demonstrative embodiments, wireless communication units 104, 132 and/or 182 include, for example, one or more radios 116, 134 and 186, respectively, e.g., including one or more wireless transmitters, receivers and/or transceivers able to send and/or receive wireless communication signals, RF signals, frames, blocks, transmission streams, packets, messages, data items, and/or data. For example, wireless communication units 104, 132 and/or 182 may include or may be implemented as part of a wireless Network Interface Card (NIC), and the like.

In some demonstrative embodiments, wireless communication devices 102, 130 and 180 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 104, 132 and/or 182 may form a wireless local area network (WLAN).

In some demonstrative embodiments, wireless communication devices 102, 130 and/or 180 may perform the functionality of DMG stations ("DMG STA"). For example, wireless communication devices 102, 130 and/or 180 may be configured to communicate over the DMG band.

In some demonstrative embodiments, wireless communication medium 103 may include a wireless gigabit (WiGig) link. For example, wireless communication medium 103 may include a wireless beamformed link over the 60 GHZ frequency band.

In some demonstrative embodiments, system 100 may include, for example, a PCP STA and one or more non-PCP STAs. For example, device 102 may perform the functionality of a PCP STA and devices 130 and/or 180 may perform the functionality of a non-PCP STA.

In some demonstrative embodiments, wireless communication devices 104, 132 and/or 182 may form a WiFi network.

In some demonstrative embodiments, wireless communication medium 103 may include a direct link, e.g., a P2P link, for example, to enable direct communication between device 102 and devices 130 and/or 180.

In some demonstrative embodiments, wireless communication devices 104, 132 and/or 182 may perform the functionality of WFA P2P devices. For example, device 102 may perform the functionality of a P2P group owner, and devices 130 and/or 108 may perform the functionality of a P2P client device.

In other embodiments, devices 102, 130 and/or 180 may perform the functionality of any other device and/or station.

In other embodiments, wireless communication devices 102, 130 and 180 may communicate over any other band and/or according to any other protocol and/or specification.

In some demonstrative embodiments, devices 102, 130 and/or 180 may communicate during a beacon interval. For example, device 102 may transmit a beacon frame to define the beacon interval.

In some demonstrative embodiments, the beacon frame may allocate one or more association beamforming training (ABFT) periods within the beacon interval, e.g., during which one or more devices of system 100 may transmit beamforming transmissions to device 102.

In some demonstrative embodiments, the beamforming transmission may include a sector sweep (SSW) transmission within the ABFT, e.g., in order to determine appropriate antenna settings to be used for communication between device 102 and device 130 and/or between device 102 and device 180.

In one example, device 130 may transmit a beamforming transmission, e.g., a SSW transmission, to device 102.

In some demonstrative embodiments, device 102 may receive the beamforming transmission from device 130 and may respond with a feedback transmission, e.g., a SSW feedback transmission, for example, to complete the beamforming training procedure.

In some demonstrative embodiments, devices 130 and 102 may exchange a probe request and a probe response subsequent to the feedback transmission.

In some demonstrative embodiments, a congestion level of wireless communication medium 103 may be related to a number of devices in the network attempting a transmission during the ABFT period. For example, the congestion level may increase if the number of devices transmitting a response during the ABFT period increases.

In some demonstrative embodiments, a relatively high number of devices responding during the ABFT period may result in multiple collisions within medium 103, and may increase the congestion within medium 103 and cause interference.

In some demonstrative embodiments, device 102 may discover a device within range, e.g., after receiving a beamforming transmission from the device.

In some demonstrative embodiments, congestion within medium 103 may result in failure to discover all devices. For example, device 102 may not be able to discover one or more devices in range, for example, if medium 103 is congested, e.g., as described below.

In some demonstrative embodiments, both devices 130 and 180 may attempt to transmit during the ABFT period.

In some demonstrative embodiments, device 102 may be able to receive the beamforming transmission from device 130 and may not be able to receive the beamforming transmission from device 180. For example, the beamforming transmission from device 130 to device 102 may be stronger than the beamforming transmission from device 180 to device 102, for example, if device 130 is closer to device 102.

In some demonstrative embodiments, device 102 may attempt to discover the devices during a next ABFT, and devices 130 and 180 may attempt another transmission to device 102.

In some demonstrative embodiments, during the next ABFT device 102 may be able to receive the beamforming transmission from device 130 and may not be able to receive the beamforming transmission from device 180.

In some demonstrative embodiments, device 102 may be able to discover device 130 and may not be able to discover device 180, e.g., if device 130 continues responding to device 102 every ABFT period, for example, since device 102 may not receive any transmission from device 180, e.g., due to the stronger transmission by device 130.

In some demonstrative embodiments, randomizing sector order within SSW messages during an ABFT period and/or adding more ABFT slots may allow successful beamforming with some of the available devices. However, randomizing sector order within SSW messages during an ABFT period and/or adding more ABFT slots may result in undiscovered devices and may cause interference over the ABFT period.

In some demonstrative embodiments, interference over the ABFT may be reduced. For example, a device completing the beamforming training may set a backoff period, which may enable device 102 to discover other devices, e.g., device 180.

In some demonstrative embodiments, device 130 may set a backoff period, extending over one or more successive A-BFT periods, after completing the beamforming training.

In some demonstrative embodiments, during the backoff period, device 130 may not respond to beacon frames from device 102. For example, device 130 may receive the beacon frame from device 102, may transmit the beamforming transmission during the ABFT period, may receive a feedback transmission from device 102, and may set a backoff period, during which device 130 may stop responding to beacon frames from device 102.

In some demonstrative embodiments, device 130 may set the back off period for device 102 subsequent to exchanging the probe request and probe response with device 102, e.g., as described above.

In some demonstrative embodiments, device 130 may set a back off period for device 102 subsequent to receiving a feedback transmission from device 102, e.g., without communicating a probe request and/or probe response with device 102. In one example, device 130 may set a first back off period for device 102, e.g., subsequent to exchanging the probe request and probe response with device 102, and may later set a second back-off period subsequent to the first back-off period, e.g., without communicating with device 102 the probe request and/or probe response.

In some demonstrative embodiments, device 130 may transmit beamforming transmissions to device 102 only after the backoff period.

In some demonstrative embodiments, device 130 may respond to beacon frames from another device during the backoff period. For example, device 130 may respond to beacon frames from a device 120 during the backoff period.

In some demonstrative embodiments, device 180 may not be able to complete the beamforming training, and may continue responding to beacon frames from device 102.

In some demonstrative embodiments, device 130 may receive the beacon frame from device 102 and may not transmit the beamforming transmission to device 102. Consequently, device 102 may be able to discover device 180. For example, within the next ABFT, device 130 may not respond to the beacon frame from device 102, while device 180 may respond to the beacon frame from device 102. As a result, device 102 may be able to discover device 180.

In some demonstrative embodiments, the backoff period may be time limited, e.g., to allow periodic refresh of scan results by repeating beamforming with the discovered devices.

In some demonstrative embodiments, device 130 may receive from device 102 an information element (IE) including a duration value, and may set a duration of the backoff period according to the duration value. For example, device 102 may transmit the backoff duration to device 130 through a beacon frame and/or a probe frame, e.g., to allow device 102 to control the duration of the backoff period, e.g., in accordance with a power saving mechanism of device 102.

In other demonstrative embodiments, the duration of the backoff period may be preset or may be defined in any other manner.

In some demonstrative embodiments, the backoff period may be longer than the duration of the beacon interval.

In some demonstrative embodiments, the duration of the backoff period may be at least three times longer than the duration of the beacon interval, or any other duration.

In some demonstrative embodiments, device 102 may trigger device 130 to respond to device 102 during the backoff period.

In some demonstrative embodiments, device 102 may trigger device 130 to respond to device 102 during the backoff period, for example, to trigger device 130 to repeat the beamforming training, e.g., upon detecting degradation in the communication with device 130 and/or for any other reason.

In some demonstrative embodiments, device 130 may respond to device 102 even during the backoff period, e.g., upon receiving a unicast beacon frame from device 102.

In some demonstrative embodiments, device 102 may transmit the unicast beacon frame to device 130 during the backoff period, e.g., in order to receive a feedback from device 130. For example the unicast beacon frame may include an ABFT address equal to a local address of device 130, a Discovery Mode (DM) field having a predefined value, e.g., 1, and/or a Clustering Control (CC) field having a predefined value, e.g., 1.

In some demonstrative embodiments, device 130 may be configured to terminate the backoff period upon receiving the unicast beacon frame from device 102. For example, device 130 may transmit a feedback transmission in response to the reception of the unicast beacon frame from device 102 and may terminate the backoff period.

In other demonstrative embodiments, device 130 may not terminate the backoff period upon receiving the unicast beacon frame from device 102. For example, device 130 may transmit a feedback transmission in response to the reception of the unicast beacon frame from device 102 and may continue with the backoff period.

In some demonstrative embodiments, the backoff period of device 130 and the backoff period of device 180 may not be aligned in time. For example, device 130 may start a first backoff period during a first beacon interval, while device 180 may start a second backoff period during a second beacon interval. Accordingly, the first and second backoff periods may end at different times, e.g., at different beacon intervals. As a result, there may be a situation in which there may be no overlap between the backoff periods of devices 130 and 180, e.g., during one or more ABFT periods. Accordingly, there may be a situation, in which, during each ABFT period of a sequence of consecutive ABFT periods least one of devices 130 and 180 may perform a transmission.

In some demonstrative embodiments, another device may not be discovered by device 102 during an ABFT, e.g., if during the ABFT there is no overlap between the backoff periods of devices 130 and 180.

In some embodiments, device 102 may utilize a filtering mechanism to filter one or more responses from one or more devices, e.g., as described below.

In some demonstrative embodiments, the filtering mechanism may cause devices 130 and 180 to schedule the backoff periods, for example, in a way, which may increase an overlap between the backoff periods of devices 130 and 180, e.g., as described below.

In some demonstrative embodiments, device 102 may utilize a filtering mechanism, which may configured to reduce power consumption of device 102, for example, by limiting a rate of communicating frames with devices 130 and/or 180, thus reducing the power consumption of device 102, e.g., as described below.

In some demonstrative embodiments, device 102 may set a filtering period corresponding to device 130, for example, upon completing the exchange of the beamforming transmissions during the ABFT period, and the exchange of the probe request and probe response.

In some demonstrative embodiments, device 102 may set the filtering time period to extend over one or more successive A-BFT periods, during which device 102 may ignore one or more beamforming transmissions from device 130.

In some demonstrative embodiments, device 102 may ignore all beamforming transmissions from device 130 during the filtering period corresponding to device 130.

In some demonstrative embodiments, device 102 may respond to the beamforming transmissions from device 130 only after the filtering time period of device 130.

In some demonstrative embodiments, device 102 may respond to one or more beamforming transmissions from device 130 during the filtering period of device 130.

In some demonstrative embodiments, device 102 may ignore one or more probe requests from device 130 during the filtering period of device 130.

In some demonstrative embodiments, device 102 may respond to probe requests from device 130 after the filtering time period of device 130.

In some demonstrative embodiments, device 102 may truncate the filtering time period of device 130. In one example, device 102 may truncate the filtering time period of device 130, for example, if another filtering period ends, e.g., as described below. In another example, device 102 may truncate the filtering time period of device 130, for example, to trigger responses from one or more responder devices, or for any other reason.

In some demonstrative embodiments, device 102 may set a first filtering time period for device 130 after a first ABFT period, and a second filtering time period for device 180 after a second ABFT period, e.g., subsequent to the first ABFT period.

In some demonstrative embodiments, a beginning time of the first filtering time period between device 102 and device 180 may be later than a beginning time of the second filtering time period between device 102 and device 130.

In some demonstrative embodiments, device 102 may align an end time of the first and second filtering time periods among devices 102 and 180.

In some demonstrative embodiments, device 102 may set a plurality of filtering time periods for a plurality of devices.

In some demonstrative embodiments, device 102 may align the plurality of filtering time period to end at the same time.

In some demonstrative embodiments, once a filtering time period ends, device 102 may truncate all other filtering time periods. For example, once the filtering period of device 130 ends, device 102 may truncate filtering period 180.

In some demonstrative embodiments, the alignment of the filtering time periods may enable discovering available devices within range of device 102, for example, since removing all filtering time periods may enable the responder devices to schedule the backoff periods, for example, in a way which may increase an overlap between the backoff periods of the devices, thereby enabling another undiscovered device to be discovered by device 102, e.g., as described below.

In some demonstrative embodiments, the duration of the filtering time period may be longer than the duration of the beacon interval.

In some demonstrative embodiments, the duration of the filtering time period may be at least three times longer than the duration of the beacon interval.

In some demonstrative embodiments, the duration of the filtering time period may be equal to or longer than the duration of the back off period. For example, device 102 may transmit the IE to devices 130 and 180 to set the backoff period to be used by devices 130 and 10u8 to be equal to or shorter than the filtering time period to be used by device 102.

In some demonstrative embodiments, a device, e.g., device 130 may perform the backoff mechanism, e.g., even without another device, e.g., device 102, setting a filtering time period.

In other demonstrative embodiments, a device, e.g., device 102 may set filtering time period, e.g., even without another device, e.g., device 180, performing the backoff mechanism.

Figure 2A:
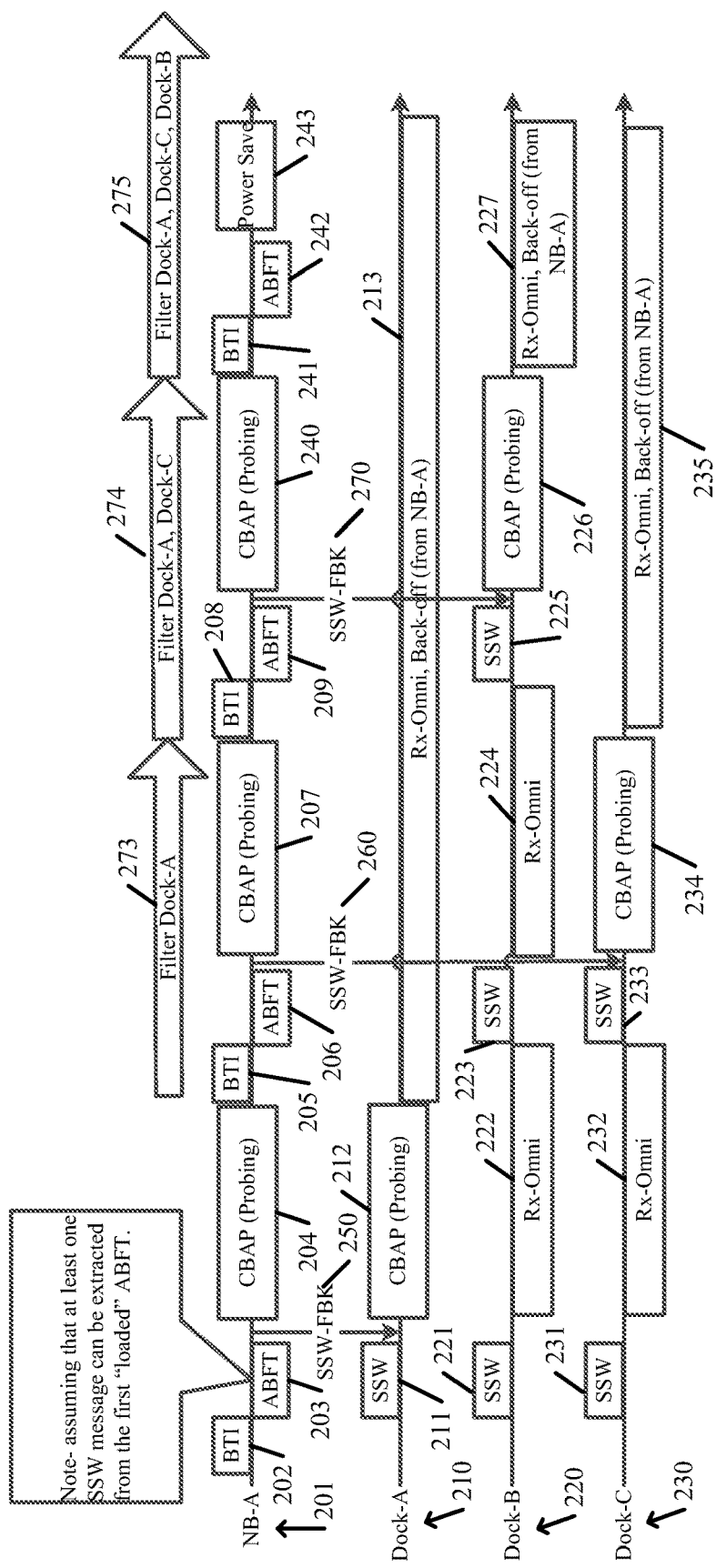
FIG. 2A is a schematic sequence diagram of operations and interactions between a beacon sender and a plurality of beacon responders, within a beacon interval, in accordance with some demonstrative embodiments.

Reference in now made to FIG. 2A, which schematically illustrates a sequence diagram 200, which demonstrates operations and interactions between a beacon sender device 201 and beacon responder devices 210, 220 and 230. For example, beacon sender device 201 may perform the functionality of device 102 (FIG. 1), beacon responder device 210 may perform the functionality of device 130 (FIG. 1) and/or beacon responder device 220 may perform the functionality of device 180 (FIG. 1).

In one example, device 201 may perform the functionality of a mobile device and devices 210, 220 and 230 may perform the functionality of docking devices. For example, device 201 may be a notebook (NB), denoted NB-A, and devices 210, 220 and 230 may be wireless docking devices, denoted Dock-A, Dock-B and Dock-C respectively.

In some demonstrative embodiments, device 201 may transmit a beacon frame within BTI 202, e.g., to define an ABFT period.

In some demonstrative embodiments, devices 210, 220 and 230 may transmit a beamforming transmission to device 201 during the ABFT period 203.

In some demonstrative embodiments, the beamforming transmissions may include sector sweep (SSW) transmissions 211, 221 and 231 transmitted within ABFT 203 by devices 210, 220 and 230, respectively.

In some demonstrative embodiments, device 201 may receive transmission 211 from device 210, and may not receive transmissions 221 and 231 transmitted from devices 220 and 230, respectively, e.g., if transmission 211 is stronger than transmissions 221 and 231. For example, device 210 may be closer to device 201 than devices 220 and 230.

In some demonstrative embodiments, device 201 may respond to device 210 with a SSW feedback transmission 250.

In some demonstrative embodiments, devices 201 and 210 may set probing modes 204 and 212, respectively, subsequent to feedback transmission 250, during which devices 201 and 210 may exchange probe request and probe response transmissions.

In some demonstrative embodiments, devices 220 and 230 may wait at receive (Rx) Omni directional modes 222 and 232, respectively, e.g., since devices 220 and 230 did not receive a response to SSW 221 and 231.

In some demonstrative embodiments, device 210 may set a backoff period 213, extending over one or more successive A-BFT periods 206, 209 and 242, after completing the beamforming training, during which device 210 may wait at a Rx-Omni directional mode.

In some demonstrative embodiments, device 201 may transmit a beacon frame within BTI 205, defining the next ABFT period 206.

In some demonstrative embodiments, devices 220 and 230 may transmit a beamforming transmission to device 201 during ABFT period 206.

In some demonstrative embodiments, the beamforming transmissions may include SSW transmissions 223 and 233 within ABFT 206.

In some demonstrative embodiments, device 210 may not respond to device 201 during ABFT period 206, since ABFT period 206 may be within the backoff period 213 of device 210.

In some demonstrative embodiments, device 201 may receive transmission 233 from device 230, and may not receive transmission 223 from device 220, e.g., if transmission 233 is stronger than transmission 223. For example, device 230 may be closer to device 201 than device 220.

In some demonstrative embodiments, device 201 may respond to device 233 with a SSW feedback transmission 260.

In some demonstrative embodiments, devices 201 and 230 may set probing modes 207 and 234, respectively, subsequent to feedback transmission 260, during which devices 201 and 230 may exchange probe request and probe response transmissions.

In some demonstrative embodiments, device 220 may wait at Rx Omni directional mode 224, e.g., since device 220 did not receive a response to SSW 223.

In some demonstrative embodiments, device 230 may set a backoff period 235, extending over two or more successive A-BFT periods 209 and 242, after completing the beamforming training, during which device 230 may wait at a Rx-Omni directional mode.

In some demonstrative embodiments, device 201 may transmit a beacon frame within BTI 208, defining the next ABFT period 209.

In some demonstrative embodiments, device 220 may transmit a beamforming transmission to device 201 during ABFT period 209.

In some demonstrative embodiments, the beamforming transmissions may include a SSW transmission 225 within ABFT 209.

In some demonstrative embodiments, device 230 may not respond to device 201 during ABFT period 209, since ABFT period 209 may be within the backoff period 235 of device 230.

In some demonstrative embodiments, device 210 may not respond to device 201 during ABFT period 209, since ABFT period 209 may be within the backoff period 213 of device 210.

In some demonstrative embodiments, device 201 may receive transmission 225 from device 220.

In some demonstrative embodiments, device 201 may respond to device 220 with a SSW feedback transmission 270.

In some demonstrative embodiments, devices 201 and 220 may set probing modes 240 and 226, respectively, subsequent to feedback transmission 270, during which devices 201 and 220 may exchange probe request and probe response transmissions.

In some demonstrative embodiments, device 220 may set a backoff period 227, extending over two or more successive A-BFT periods, after completing the beamforming training, during which device 220 may wait at a Rx-Omni directional mode.

In some demonstrative embodiments, device 201 may apply a filtering mechanism to filter one or more responses from devices 210, 220 and/or 230.

In some demonstrative embodiments, device 201 may set a filtering time period extending over one or more successive A-BFT periods, upon completion of probing mode 204. For example, device 201 may set a filtering period, denoted Filter Dock-A, extending over A-BFT periods 206, 209, 242 or more.

In some demonstrative embodiments, during the filtering time period Filter Dock-A device 201 may ignore one or more beamforming transmissions from device 210.

In some demonstrative embodiments, device 201 may set a filtering time period extending over one or more successive A-BFT periods, upon completion of probing mode 207. For example, device 201 may set a filtering period, denoted Filter Dock-B, extending over A-BFT periods 209, 242 or more.

In some demonstrative embodiments, during the filtering time period Filter Dock-B device 201 may ignore one or more beamforming transmissions from device 230.

In some demonstrative embodiments, device 201 may set a filtering time period extending over one or more successive A-BFT periods, upon completion of probing mode 240. For example, device 201 may set a filtering period, denoted Filter Dock-C, extending over A-BFT period 242 or more.

In some demonstrative embodiments, during the filtering time period Filter Dock-C device 201 may ignore one or more beamforming transmissions from device 220.

In some demonstrative embodiments, during a time period 273, device 201 may filter communications only from device 210. For example, device 201 may respond to transmissions from devices 220 and/or 230 during time period 273.

In some demonstrative embodiments, during a time period 274, device 201 may filter communications from both devices 210 and 230. For example, device 201 may respond to transmissions from device 220 during time period 274.

In some demonstrative embodiments, during a time period 275, device 201 may filter communications from device 210, 220 and 230. For example, device 201 may not respond to transmissions from devices 210, 220 and 230 during time period 275.

In some demonstrative embodiments, device 201 may transmit a beacon frame within BTI 241, defining the next ABFT period 242.

In some demonstrative embodiments, device 201 may not receive any transmission during ABFT 242, e.g., since devices 210, 220 and 230 are at backoff periods 213, 227 and 235, respectively.

In some demonstrative embodiments, device 201 may switch to a power saving mode 243, e.g., if device 201 filters communication from devices 210, 220 and 230 and/or if device 201 does not receive a response during ABFT 242.

Figure 2B:
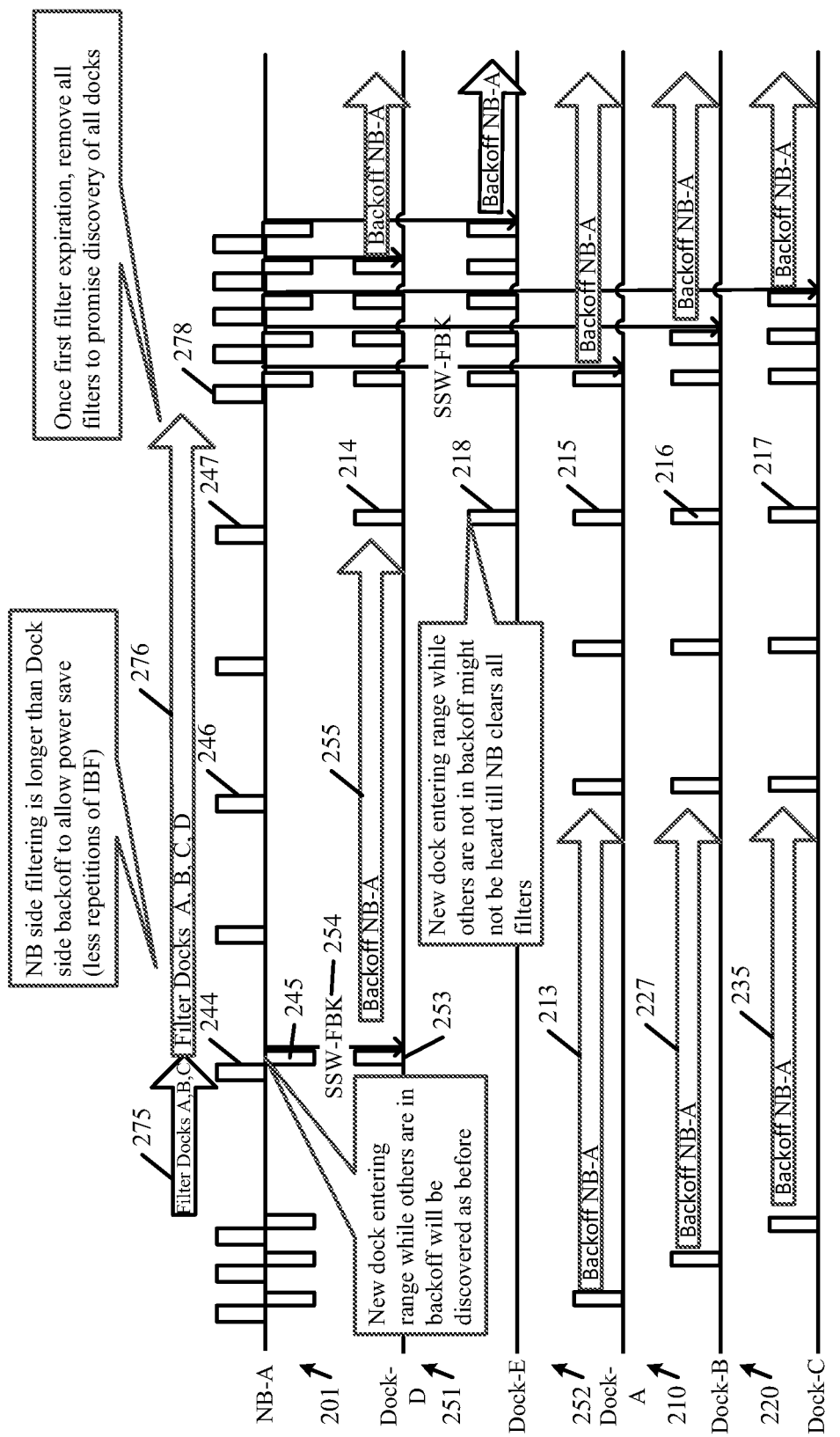
FIG. 2B is a schematic sequence diagram of operations and interactions between a beacon sender and a plurality of beacon responders, within a sequence of beacon intervals, in accordance with some demonstrative embodiments.

Reference in now made to FIG. 2B, which schematically illustrates a sequence diagram 280, which demonstrates operations and interactions between the devices of FIG. 2A and additional beacon responding devices 251 and 252 during a plurality of additional beacon intervals, in accordance with some demonstrative embodiments.

In one example, devices 251 and 252 may perform the functionality of docking devices. For example, devices 251 and 252 may include wireless docking devices, denoted Dock-D and Dock-E, respectively.

In some demonstrative embodiments, the filtering period 275 may extend over a plurality of beacon intervals, during which device 201 may filter communications from devices 210, 220 and 230.

In some demonstrative embodiments, backoff periods 213, 227 and 235 may extend over a plurality of A-BFT periods, during which devices 210, 220 and 230 may not respond to transmissions from device 201.

In some demonstrative embodiments, backoff periods 213, 227 and 235 may be aligned within a range of a beacon transmission interval, e.g., since devices 210, 220 and 230 began sequence 200 (FIG. 2A) during the same beacon interval. For example, devices 210, 220 and 230 may end backoff periods 213, 227 and 235 with the same beacon interval, e.g., after a beacon interval 246, since devices 210, 220 and 230 have set backoff periods 213, 227 and 235 to begin within the same beacon interval.

In some demonstrative embodiments, device 201 may transmit a beacon frame within BTI 244, defining a next ABFT period 245.

In some demonstrative embodiments, device 251 may transmit a beamforming transmission to device 201 during ABFT period 245.

In some demonstrative embodiments, the beamforming transmissions may include a SSW transmission 253 within ABFT 245.

In some demonstrative embodiments, device 201 may receive transmission 253 from device 251, e.g., since devices 210, 220 and 230 may be at backoff periods 213, 227 and 235.

In some demonstrative embodiments, device 201 may respond to device 253 with a SSW feedback transmission 254.

In some demonstrative embodiments, device 251 may set a backoff period 255, extending over three or more successive ABFT periods, after completing the beamforming training, during which device 251 may wait at a Rx-Omni directional mode and may not respond to device 201.

In some demonstrative embodiments, backoff period 255 may be unaligned in time with backoff periods 213, 227 and 235. For example, backoff period 255 may end after beacon transmission interval 247 and backoff periods 213, 227 and 235 may end after beacon transmission interval 246.

In some demonstrative embodiments, device 201 may set a filtering time period extending over one or more successive A-BFT periods, upon completion of the training procedure between device 201 and device 251. For example, device 201 may set a filtering period, denoted Filter Dock-D.

In some demonstrative embodiments, during time period 276, device 201 may filter communications from devices 210, 220, 230 and 251. For example, device 201 may not respond to transmissions from devices 210, 220, 230 and 251.

In some demonstrative embodiments, during the ABFT period after interval 247, devices 210, 220, 230 and 251 may not be in a backoff period and may transmit beamforming transmissions 215, 216, 217 and 214 to device 201.

In some demonstrative embodiments, a new device, e.g., device 252, may also attempt to transmit beamforming transmission 218 to device 201 during the ABFT period after interval 247.

In some demonstrative embodiments, device 201 may not be able to discover device 252, e.g., if one of the other devices, e.g., devices 210, 220, 230 or 251 may have a stronger signal than device 252 and therefore, device 201 may not receive any transmission from device 252 due to a strongest transmission by one of the other devices.

In some demonstrative embodiments, device 201 may truncate the filtering time period with all of the devices, e.g., once one of the filtering periods ends. For example, device 201 may truncate the filtering time period with devices 220, 230 and 251, e.g., once the filtering time period of device 210 ends.

In some demonstrative embodiments, truncating the filtering time period with all of the devices may enable synchronization among the backoff periods of the devices, resulting in alignment in time among all of the devices. For example, after interval 278 all of the devices within range in system 200 (FIG. 2), e.g., devices 251, 252, 210, 220 and 230, may attempt to transmit beamforming transmissions during the same ABFT, and may accordingly schedule the back off periods with an overlap which may enable discovery of device 252 by device 201.

In some demonstrative embodiments, the alignment in time may enable device 201 to discover all of the devices including device 252.

Figure 3:
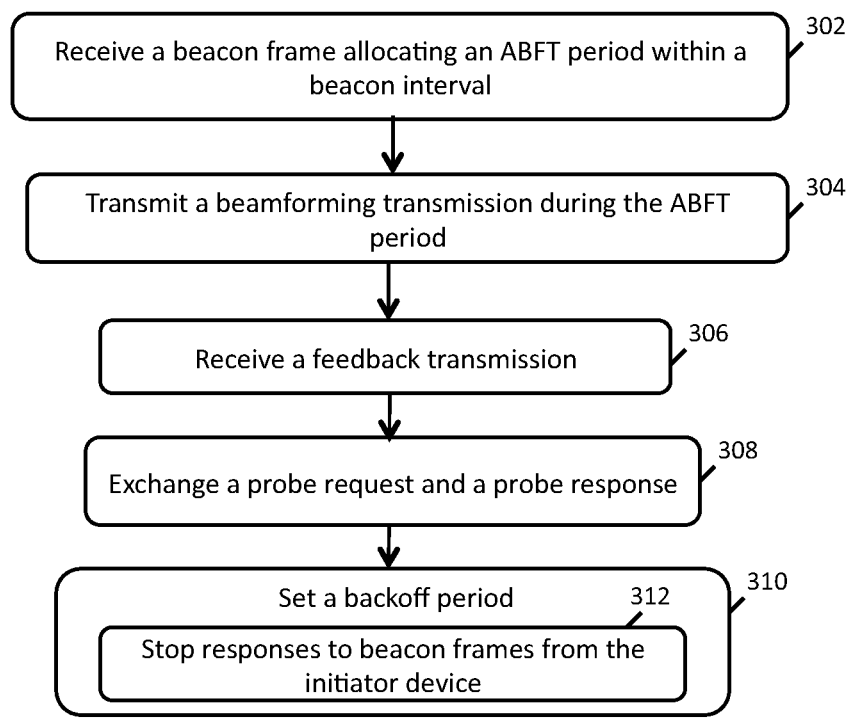
FIG. 3 is a schematic flow chart illustration of a method of communicating during beacon intervals according to a backoff mechanism, in accordance with some demonstrative embodiments.

Reference is made to FIG. 3, which schematically illustrates a method of communicating during beacon intervals according to a backoff mechanism, in accordance with some demonstrative embodiments. For example, one or more of the operations of the method of FIG. 3 may be performed by a wireless communication system e.g., system 100 (FIG. 1); a wireless communication device, e.g., devices 130 (FIG. 1), 180 (FIG. 1), 210 (FIGS. 2A and 2B), 220 (FIGS. 2A and 2B), 230 (FIGS. 2A and 2B), 251 (FIG. 2B) and/or 252 (FIG. 2B); and/or a wireless communication unit, e.g., wireless communication units 132 and/or 182 (FIG. 1).

As indicated at block 302, the method may include receiving from an initiator device a beacon frame allocating an ABFT period within a beacon interval. For example, device 130 (FIG. 1) may receive from device 102 (FIG. 1) a beacon frame allocating an ABFT period within a beacon interval, e.g., as described above.

As indicated at block 304, the method may include transmitting to the initiator device a beamforming transmission during the ABFT period. For example, device 130 (FIG. 1) may transmit to device 102 (FIG. 1) a SSW transmission during the ABFT period, e.g., as described above.

As indicated at block 306, the method may include receiving from the initiator device a feedback transmission, e.g., in response to the beamforming transmission. For example, device 130 (FIG. 1) may receive a SSW feedback transmission from device 102 (FIG. 1) in response to the beamforming transmission, e.g., as described above.

As indicated at block 308, the method may include exchanging a probe request and a probe response with the initiator device subsequent to the feedback transmission. For example, device 130 (FIG. 1) may exchange a probe request and a probe response with device 102 (FIG. 1) subsequent to the SSW feedback transmission, e.g., as described above.

As indicated at block 310, the method may include setting a backoff period extending over one or more successive ABFT periods, e.g., subsequent to exchanging the beamforming transmissions and the probe request and probe response. For example, device 130 (FIG. 1) may set a backoff period for device 102 (FIG. 1), e.g., as described above.

As indicated at block 312, the method may include stopping responses to beacon frames from the initiator device during the backoff period. For example, device 130 (FIG. 1) may stop responses to beacon frames from device 102 (FIG. 1) during the backoff period set for device 102 (FIG. 1), e.g., as described above.

Figure 4:
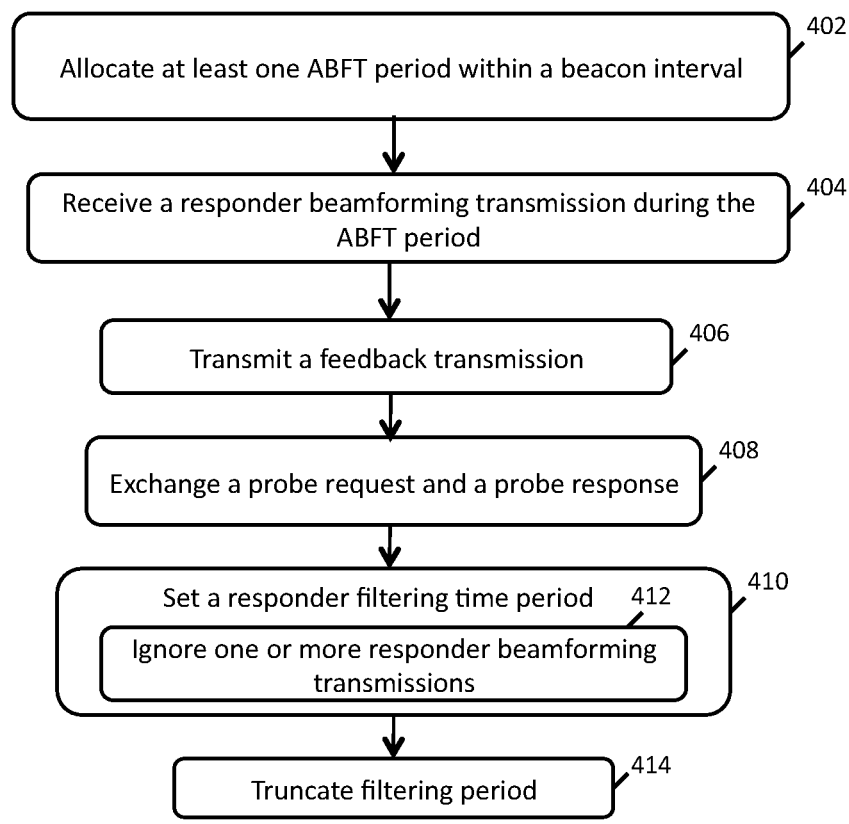
FIG. 4 is a schematic flow chart illustration of a method of communicating during beacon intervals according to a filtering mechanism, in accordance with some demonstrative embodiments.

Reference is now made to FIG. 4, which schematically illustrates a method of communicating during beacon intervals according to a filtering mechanism, in accordance with some demonstrative embodiments. For example, one or more of the operations of the method of FIG. 4 may be performed by a wireless communication system, e.g., system 100 (FIG. 1); a wireless communication device, e.g., device 102 (FIG. 1) and/or device 201 (FIGS. 2A and/or 2B); and/or a wireless communication unit, e.g., wireless communication unit 104 (FIG. 1).

As indicated at block 402, the method may include allocating at least one ABFT period within a beacon interval. For example, device 102 (FIG. 1) may allocate at least one ABFT period, e.g., as described above.

As indicated at block 404, the method may include receiving a responder beamforming transmission during the ABFT period. For example, device 102 (FIG. 1) may receive a SSW transmission from device 130 (FIG. 1) during the ABFT period, e.g., as described above.

As indicated at block 406, the method may include transmitting a feedback transmission to the responder device, e.g., in response to the beamforming transmission. For example, device 102 (FIG. 1) may transmit a SSW feedback transmission to device 130 (FIG. 1), e.g., as described above.

As indicated at block 408, the method may include exchanging a probe request and a probe response with the responder device. For example, device 102 (FIG. 1) may exchange a probe request and a probe response with device 130 (FIG. 1), e.g., as described above.

As indicated art block 410, the method may include setting a responder filtering time period for the responder device, e.g., subsequent to exchanging the probe request and probe response. For example, device 102 (FIG. 1) may set a filtering period for device 103 (FIG. 1), e.g., as described above.

As indicated at block 412, the method may include ignoring one or more responder beamforming transmissions from the responder during the filtering time period of the responder. For example, device 102 (FIG. 1) may ignore beamforming transmissions from device 130 (FIG. 1) during the filtering time period of device 130 (FIG. 1), e.g., as described above.

As indicated at block 414, the method may include truncating the filtering time period. For example, device 102 (FIG. 1) may truncate the filtering time period of device 130 (FIG. 1), for example, when another filtering period of another device ends.

Figure 5:
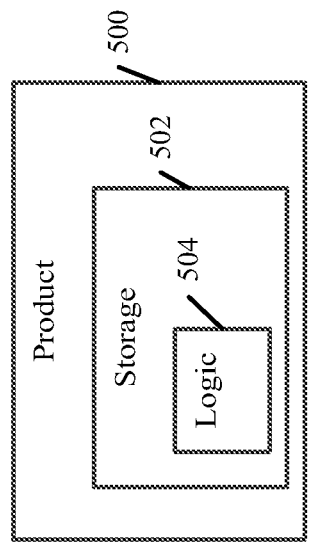
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of wireless communication devices 102, 130, 180 and/or 120 (FIG. 1), wireless communication devices 201, 210, 220, 230, 251 and/or 252 (FIGS. 2A and 2B), and wireless communication units 104, 132 and/or 182 (FIG. 1), and/or to perform one or more operations of the method of FIG. 3 and/or FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication unit to allocate at least one association beamforming training (A-BFT) period, to receive a responder beamforming transmission from a responder device during the A-BFT period, to transmit to the responder device a feedback transmission in response to the responder beamforming transmission, and to set a responder filtering period extending over one or more successive A-BFT periods, wherein the wireless communication unit is to ignore one or more responder beamforming transmissions from the responder device during the filtering period.

Example 2 includes the subject matter of Example 1 and optionally, wherein the wireless communication unit is to exchange a probe request and a probe response with the responder device subsequent to the feedback transmission, and to set the responder filtering period subsequent to the exchange of the probe request and the probe response.

Example 3 includes the subject matter of Example 1 or 2 and optionally, wherein the wireless communication unit is to ignore all responder beamforming transmissions from the responder device during the filtering period.

Example 4 includes the subject matter of any one of Examples 1-3 and optionally, wherein the wireless communication unit is to respond to responder beamforming transmissions from the responder device only after the responder filtering period.

Example 5 includes the subject matter of Example 1 or 2 and optionally, wherein the wireless communication unit is to respond to one or more responder beamforming transmissions from the responder device during the filtering period.

Example 6 includes the subject matter of any one of Examples 1-5 and optionally, wherein the wireless communication unit is to ignore one or more probe requests from the responder device during the filtering period.

Example 7 includes the subject matter of any one of Examples 1-6 and optionally, wherein the wireless communication unit is to respond to probe requests from the responder device only after the responder filtering period.

Example 8 includes the subject matter of any one of Examples 1-7 and optionally, wherein the wireless communication unit is to receive a first responder beamforming transmission from a first responder device during a first A-BFT period, and to set a first responder filtering period, wherein the wireless communication unit is to receive a second responder beamforming transmission from a second responder device during a second A-BFT period, and to set a second responder filtering period, and wherein the second A-BFT period is successive to the first A-BFT period, and a beginning time of the second responder filtering period is later than a beginning time of the first responder filtering period.

Example 9 includes the subject matter of Example 8 and optionally, wherein the wireless communication unit is to align an end time of the second filtering period with an end time of the first filtering period.

Example 10 includes the subject matter of any one of Examples 1-9 and optionally, wherein the wireless communication unit is to truncate the responder filtering period.

Example 11 includes the subject matter of any one of Examples 1-10 and optionally, wherein a duration of the responder filtering period is longer than a duration of a beacon interval.

Example 12 includes the subject matter of Example 11 and optionally, wherein the duration of the responder filtering period is at least three times longer than the duration of the beacon interval.

Example 13 includes the subject matter of any one of Examples 1-12 and optionally, wherein the responder beamforming transmission comprises a sector sweep (SSW) transmission, and the feedback transmission comprises a SSW feedback transmission.

Example 14 includes an apparatus of wireless communication, the apparatus comprising a wireless communication unit to receive from an initiator device a beacon frame allocating an association beamforming training (A-BFT) period, to transmit to the initiator device a beamforming transmission during the A-BFT period, to receive from the initiator device a feedback transmission in response to the beamforming transmission, and to set a backoff period extending over one or more successive A-BFT periods, wherein the wireless communication unit is to stop responding to beacon frames from the initiator device during the backoff period.

Example 15 includes the subject matter of Example 14 and optionally, wherein the wireless communication unit is to exchange a probe request and a probe response with the initiator device subsequent to the feedback transmission, and to set the backoff period subsequent to the exchange of the probe request and the probe response Example 16 includes the subject matter of Example 14 or 15 and optionally, wherein the wireless communication unit is to transmit a feedback transmission in response to reception of a unicast beacon frame from the initiator device during the backoff period, the unicast beacon frame including an A-BFT-responder address equal to an address of the wireless communication unit.

Example 17 includes the subject matter of Example 16 and optionally, wherein the wireless communication unit is to terminate the backoff period upon reception of the unicast beacon frame.

Example 18 includes the subject matter of any one of Examples 14-17 and optionally, wherein the wireless communication unit is to receive from the initiator device an information element including a duration value, and to set a duration of the backoff period according to the duration value.

Example 19 includes the subject matter of any one of Examples 14-18 and optionally, wherein the wireless communication unit is to respond to beacon frames from another initiator device during the backoff period.

Example 20 includes the subject matter of any one of Examples 14-19 and optionally, wherein the backoff period is longer than a duration of a beacon interval.

Example 21 includes the subject matter of Example 20 and optionally, wherein the duration of the backoff period is at least three times longer than the duration of the beacon interval.

Example 22 includes the subject matter of any one of Examples 14-21 and optionally, wherein the beamforming transmission comprises a sector sweep (SSW) transmission, and the feedback transmission comprises a SSW feedback transmission.

Example 23 includes the subject matter of any one of Examples 14-22 and optionally, wherein the wireless communication unit is to transmit a beamforming transmission to the initiator device only after the backoff period.

Example 24 includes a system of wireless communication, the system comprising a wireless communication device including at least one antenna; and a wireless communication unit to allocate at least one association beamforming training (A-BFT) period, to receive a responder beamforming transmission from a responder device during the A-BFT period, to transmit to the responder device a feedback transmission in response to the responder beamforming transmission, and to set a responder filtering period extending over one or more successive A-BFT periods, wherein the wireless communication unit is to ignore one or more responder beamforming transmissions from the responder device during the filtering period.

Example 25 includes the subject matter of Example 24 and optionally, wherein the wireless communication unit is to exchange a probe request and a probe response with the responder device subsequent to the feedback transmission, and to set the responder filtering period subsequent to the exchange of the probe request and the probe response.

Example 26 includes the subject matter of Example 24 or 25 and optionally, wherein the wireless communication unit is to ignore all responder beamforming transmissions from the responder device during the filtering period.

Example 27 includes the subject matter of any one of Examples 24-26 and optionally, wherein the wireless communication unit is to respond to responder beamforming transmissions from the responder device only after the responder filtering period.

Example 28 includes the subject matter of Example 24 or 25 and optionally, wherein the wireless communication unit is to respond to one or more responder beamforming transmissions from the responder device during the filtering period.

Example 29 includes the subject matter of any one of Examples 24-28 and optionally, wherein the wireless communication unit is to ignore one or more probe requests from the responder device during the filtering period.

Example 30 includes the subject matter of any one of Examples 24-29 and optionally, wherein the wireless communication unit is to respond to probe requests from the responder device only after the responder filtering period.

Example 31 includes the subject matter of any one of Examples 24-30 and optionally, wherein the wireless communication unit is to receive a first responder beamforming transmission from a first responder device during a first A-BFT period, and to set a first responder filtering period, wherein the wireless communication unit is to receive a second responder beamforming transmission from a second responder device during a second A-BFT period, and to set a second responder filtering period, and wherein the second A-BFT period is successive to the first A-BFT period, and a beginning time of the second responder filtering period is later than a beginning time of the first responder filtering period.

Example 32 includes the subject matter of Example 31 and optionally, wherein the wireless communication unit is to align an end time of the second filtering period with an end time of the first filtering period.

Example 33 includes the subject matter of any one of Examples 24-32 and optionally, wherein the wireless communication unit is to truncate the responder filtering period.

Example 34 includes the subject matter of any one of Examples 24-33 and optionally, wherein a duration of the responder filtering period is longer than a duration of a beacon interval.

Example 35 includes the subject matter of Example 34 and optionally, wherein the duration of the responder filtering period is at least three times longer than the duration of the beacon interval.

Example 36 includes the subject matter of any one of Examples 24-35 and optionally, wherein the responder beamforming transmission comprises a sector sweep (SSW) transmission, and the feedback transmission comprises a SSW feedback transmission.

Example 37 includes a system of wireless communication, the system comprising a wireless communication device including at least one antenna; and a wireless communication unit to receive from an initiator device a beacon frame allocating an association beamforming training (A-BFT) period, to transmit to the initiator device a beamforming transmission during the A-BFT period, to receive from the initiator device a feedback transmission in response to the beamforming transmission, and to set a backoff period extending over one or more successive A-BFT periods, wherein the wireless communication unit is to stop responding to beacon frames from the initiator device during the backoff period.

Example 38 includes the subject matter of Example 37 and optionally, wherein the wireless communication unit is to exchange a probe request and a probe response with the initiator device subsequent to the feedback transmission, and to set the backoff period subsequent to the exchange of the probe request and the probe response Example 39 includes the subject matter of Example 37 or 38 and optionally, wherein the wireless communication unit is to transmit a feedback transmission in response to reception of a unicast beacon frame from the initiator device during the backoff period, the unicast beacon frame including an A-BFT-responder address equal to an address of the wireless communication unit.

Example 40 includes the subject matter of Example 39 and optionally, wherein the wireless communication unit is to terminate the backoff period upon reception of the unicast beacon frame.

Example 41 includes the subject matter of any one of Examples 37-40 and optionally, wherein the wireless communication unit is to receive from the initiator device an information element including a duration value, and to set a duration of the backoff period according to the duration value.

Example 42 includes the subject matter of any one of Examples 37-41 and optionally, wherein the wireless communication unit is to respond to beacon frames from another initiator device during the backoff period.

Example 43 includes the subject matter of any one of Examples 37-42 and optionally, wherein the backoff period is longer than a duration of a beacon interval.

Example 44 includes the subject matter of Example 43 and optionally, wherein the duration of the backoff period is at least three times longer than the duration of the beacon interval.

Example 45 includes the subject matter of any one of Examples 37-44 and optionally, wherein the beamforming transmission comprises a sector sweep (SSW) transmission, and the feedback transmission comprises a SSW feedback transmission.

Example 46 includes the subject matter of any one of Examples 37-45 and optionally, wherein the wireless communication unit is to transmit a beamforming transmission to the initiator device only after the backoff period.

Example 47 includes a method of wireless communication, the method comprising allocating at least one association beamforming training (A-BFT) period; receiving a responder beamforming transmission from a responder device during the A-BFT period; transmitting to the responder device a feedback transmission in response to the responder beamforming transmission; setting a responder filtering period extending over one or more successive A-BFT periods; and ignoring one or more responder beamforming transmissions from the responder device during the filtering period.

Example 48 includes the subject matter of Example 47 and optionally, comprising exchanging a probe request and a probe response with the responder device subsequent to the feedback transmission, and setting the responder filtering period subsequent to the exchange of the probe request and the probe response.

Example 49 includes the subject matter of Example 47 or 48 and optionally, comprising ignoring all responder beamforming transmissions from the responder device during the filtering period.

Example 50 includes the subject matter of any one of Examples 47-49 and optionally, comprising responding to responder beamforming transmissions from the responder device only after the responder filtering period.

Example 51 includes the subject matter of Example 47 or 48 and optionally, comprising responding to one or more responder beamforming transmissions from the responder device during the filtering period.

Example 52 includes the subject matter of any one of Examples 47-51 and optionally, comprising ignoring one or more probe requests from the responder device during the filtering period.

Example 53 includes the subject matter of any one of Examples 47-52 and optionally, comprising responding to probe requests from the responder device only after the responder filtering period.

Example 54 includes the subject matter of any one of Examples 47-53 and optionally, comprising receiving a first responder beamforming transmission from a first responder device during a first A-BFT period, and setting a first responder filtering period; and receiving a second responder beamforming transmission from a second responder device during a second A-BFT period, and setting a second responder filtering period, wherein the second A-BFT period is successive to the first A-BFT period, and a beginning time of the second responder filtering period is later than a beginning time of the first responder filtering period.

Example 55 includes the subject matter of Example 54 and optionally, comprising aligning an end time of the second filtering period with an end time of the first filtering period.

Example 56 includes the subject matter of any one of Examples 47-55 and optionally, comprising truncating the responder filtering period.

Example 57 includes the subject matter of any one of Examples 47-56 and optionally, wherein a duration of the responder filtering period is longer than a duration of a beacon interval.

Example 58 includes the subject matter of Example 57 and optionally, wherein the duration of the responder filtering period is at least three times longer than the duration of the beacon interval.

Example 59 includes the subject matter of any one of Examples 47-58 and optionally, wherein the responder beamforming transmission comprises a sector sweep (SSW) transmission, and the feedback transmission comprises a SSW feedback transmission.

Example 60 includes a method of wireless communication, the method comprising receiving from an initiator device a beacon frame allocating an association beamforming training (A-BFT) period; transmitting to the initiator device a beamforming transmission during the A-BFT period; receiving from the initiator device a feedback transmission in response to the beamforming transmission; setting a backoff period extending over one or more successive A-BFT periods; and stopping responses to beacon frames from the initiator device during the backoff period.

Example 61 includes the subject matter of Example 60 and optionally, comprising exchanging a probe request and a probe response with the initiator device subsequent to the feedback transmission, and setting the backoff period subsequent to the exchange of the probe request and the probe response Example 62 includes the subject matter of Example 60 or 61 and optionally, comprising transmitting a feedback transmission in response to reception of a unicast beacon frame from the initiator device during the backoff period, the unicast beacon frame including an A-BFT-responder address equal to an address of the wireless communication unit.

Example 63 includes the subject matter of Example 62 and optionally, comprising terminating the backoff period upon reception of the unicast beacon frame.

Example 64 includes the subject matter of any one of Examples 60-63 and optionally, comprising receiving from the initiator device an information element including a duration value, and setting a duration of the backoff period according to the duration value.

Example 65 includes the subject matter of any one of Examples 60-64 and optionally, comprising responding to beacon frames from another initiator device during the backoff period.

Example 66 includes the subject matter of any one of Examples 60-65 and optionally, wherein the backoff period is longer than a duration of a beacon interval.

Example 67 includes the subject matter of Example 66 and optionally, wherein the duration of the backoff period is at least three times longer than the duration of the beacon interval.

Example 68 includes the subject matter of any one of Examples 60-67 and optionally, wherein the beamforming transmission comprises a sector sweep (SSW) transmission, and the feedback transmission comprises a SSW feedback transmission.

Example 69 includes the subject matter of any one of Examples 60-68 and optionally, comprising transmitting a beamforming transmission to the initiator device only after the backoff period.

Example 70 includes a product including a non-transitory storage medium having stored thereon instructions that, when executed by a machine, result in allocating at least one association beamforming training (A-BFT) period; receiving a responder beamforming transmission from a responder device during the A-BFT period; transmitting to the responder device a feedback transmission in response to the responder beamforming transmission; setting a responder filtering period extending over one or more successive A-BFT periods; and ignoring one or more responder beamforming transmissions from the responder device during the filtering period.

Example 71 includes the subject matter of Example 70, wherein the instructions result in exchanging a probe request and a probe response with the responder device subsequent to the feedback transmission, and setting the responder filtering period subsequent to the exchange of the probe request and the probe response.

Example 72 includes the subject matter of Example 70 or 71, wherein the instructions result in ignoring all responder beamforming transmissions from the responder device during the filtering period.

Example 73 includes the subject matter of any one of Examples 70-72, wherein the instructions result in responding to responder beamforming transmissions from the responder device only after the responder filtering period.

Example 74 includes the subject matter of Example 70 or 71, wherein the instructions result in responding to one or more responder beamforming transmissions from the responder device during the filtering period.

Example 75 includes the subject matter of any one of Examples 70-74, wherein the instructions result in ignoring one or more probe requests from the responder device during the filtering period.

Example 76 includes the subject matter of any one of Examples 70-75, wherein the instructions result in responding to probe requests from the responder device only after the responder filtering period.

Example 77 includes the subject matter of any one of Examples 70-76, wherein the instructions result in receiving a first responder beamforming transmission from a first responder device during a first A-BFT period, and setting a first responder filtering period; and receiving a second responder beamforming transmission from a second responder device during a second A-BFT period, and setting a second responder filtering period, wherein the second A-BFT period is successive to the first A-BFT period, and a beginning time of the second responder filtering period is later than a beginning time of the first responder filtering period.

Example 78 includes the subject matter of Example 77, wherein the instructions result in aligning an end time of the second filtering period with an end time of the first filtering period.

Example 79 includes the subject matter of any one of Examples 70-78, wherein the instructions result in truncating the responder filtering period.

Example 80 includes the subject matter of any one of Examples 70-79 and optionally, wherein a duration of the responder filtering period is longer than a duration of a beacon interval.

Example 81 includes the subject matter of Example 80 and optionally, wherein the duration of the responder filtering period is at least three times longer than the duration of the beacon interval.

Example 82 includes the subject matter of any one of Examples 70-81 and optionally, wherein the responder beamforming transmission comprises a sector sweep (SSW) transmission, and the feedback transmission comprises a SSW feedback transmission.

Example 83 includes a product including a non-transitory storage medium having stored thereon instructions that, when executed by a machine, result in receiving from an initiator device a beacon frame allocating an association beamforming training (A-BFT) period; transmitting to the initiator device a beamforming transmission during the A-BFT period; receiving from the initiator device a feedback transmission in response to the beamforming transmission; setting a backoff period extending over one or more successive A-BFT periods; and stopping responses to beacon frames from the initiator device during the backoff period.

Example 84 includes the subject matter of Example 83, wherein the instructions result in exchanging a probe request and a probe response with the initiator device subsequent to the feedback transmission, and setting the backoff period subsequent to the exchange of the probe request and the probe response Example 85 includes the subject matter of Example 83 or 84, wherein the instructions result in transmitting a feedback transmission in response to reception of a unicast beacon frame from the initiator device during the backoff period, the unicast beacon frame including an A-BFT-responder address equal to an address of the wireless communication unit.

Example 86 includes the subject matter of Example 85, wherein the instructions result in terminating the backoff period upon reception of the unicast beacon frame.

Example 87 includes the subject matter of any one of Examples 83-86, wherein the instructions result in receiving from the initiator device an information element including a duration value, and setting a duration of the backoff period according to the duration value.

Example 88 includes the subject matter of any one of Examples 83-87, wherein the instructions result in responding to beacon frames from another initiator device during the backoff period.

Example 89 includes the subject matter of any one of Examples 83-88 and optionally, wherein the backoff period is longer than a duration of a beacon interval.

Example 90 includes the subject matter of Example 89 and optionally, wherein the duration of the backoff period is at least three times longer than the duration of the beacon interval.

Example 91 includes the subject matter of any one of Examples 83-90 and optionally, wherein the beamforming transmission comprises a sector sweep (SSW) transmission, and the feedback transmission comprises a SSW feedback transmission.

Example 92 includes the subject matter of any one of Examples 83-91, wherein the instructions result in transmitting a beamforming transmission to the initiator device only after the backoff period.

Example 93 includes an apparatus comprising means for receiving a responder beamforming transmission from a responder device during the A-BFT period; means for transmitting to the responder device a feedback transmission in response to the responder beamforming transmission; means for setting a responder filtering period extending over one or more successive A-BFT periods; and means for ignoring one or more responder beamforming transmissions from the responder device during the filtering period.

Example 94 includes the subject matter of Example 93 and optionally, comprising means for exchanging a probe request and a probe response with the responder device subsequent to the feedback transmission, and setting the responder filtering period subsequent to the exchange of the probe request and the probe response.

Example 95 includes the subject matter of Example 93 or 94 and optionally, comprising means for ignoring all responder beamforming transmissions from the responder device during the filtering period.

Example 96 includes the subject matter of any one of Examples 93-95 and optionally, comprising means for responding to responder beamforming transmissions from the responder device only after the responder filtering period.

Example 97 includes the subject matter of Example 93 or 94 and optionally, comprising means for responding to one or more responder beamforming transmissions from the responder device during the filtering period.

Example 98 includes the subject matter of any one of Examples 93-97 and optionally, comprising means for ignoring one or more probe requests from the responder device during the filtering period.

Example 99 includes the subject matter of any one of Examples 93-98 and optionally, comprising means for responding to probe requests from the responder device only after the responder filtering period.

Example 100 includes the subject matter of any one of Examples 93-99 and optionally, comprising means for receiving a first responder beamforming transmission from a first responder device during a first A-BFT period, and setting a first responder filtering period; and receiving a second responder beamforming transmission from a second responder device during a second A-BFT period, and setting a second responder filtering period, wherein the second A-BFT period is successive to the first A-BFT period, and a beginning time of the second responder filtering period is later than a beginning time of the first responder filtering period.

Example 101 includes the subject matter of Example 100 and optionally, comprising means for aligning an end time of the second filtering period with an end time of the first filtering period.

Example 102 includes the subject matter of any one of Examples 93-101 and optionally, comprising means for truncating the responder filtering period.

Example 103 includes the subject matter of any one of Examples 93-102 and optionally, wherein a duration of the responder filtering period is longer than a duration of a beacon interval.

Example 104 includes the subject matter of Example 103 and optionally, wherein the duration of the responder filtering period is at least three times longer than the duration of the beacon interval.

Example 105 includes the subject matter of any one of Examples 93-104 and optionally, wherein the responder beamforming transmission comprises a sector sweep (SSW) transmission, and the feedback transmission comprises a SSW feedback transmission.

Example 106 includes an apparatus comprising means for receiving from an initiator device a beacon frame allocating an association beamforming training (A-BFT) period; means for transmitting to the initiator device a beamforming transmission during the A-BFT period; means for receiving from the initiator device a feedback transmission in response to the beamforming transmission; means for setting a backoff period extending over one or more successive A-BFT periods; and means for stopping responses to beacon frames from the initiator device during the backoff period.

Example 107 includes the subject matter of Example 106 and optionally, comprising means for exchanging a probe request and a probe response with the initiator device subsequent to the feedback transmission, and setting the backoff period subsequent to the exchange of the probe request and the probe response Example 108 includes the subject matter of Example 106 or 107 and optionally, comprising means for transmitting a feedback transmission in response to reception of a unicast beacon frame from the initiator device during the backoff period, the unicast beacon frame including an A-BFT-responder address equal to an address of the wireless communication unit.

Example 109 includes the subject matter of Example 108 and optionally, comprising means for terminating the backoff period upon reception of the unicast beacon frame.

Example 110 includes the subject matter of any one of Examples 106-109 and optionally, comprising means for receiving from the initiator device an information element including a duration value, and setting a duration of the backoff period according to the duration value.

Example 111 includes the subject matter of any one of Examples 106-110 and optionally, comprising means for responding to beacon frames from another initiator device during the backoff period.

Example 112 includes the subject matter of any one of Examples 106-111 and optionally, wherein the backoff period is longer than a duration of a beacon interval.

Example 113 includes the subject matter of Example 112 and optionally, wherein the duration of the backoff period is at least three times longer than the duration of the beacon interval.

Example 114 includes the subject matter of any one of Examples 106-113 and optionally, wherein the beamforming transmission comprises a sector sweep (SSW) transmission, and the feedback transmission comprises a SSW feedback transmission.

Example 115 includes the subject matter of any one of Examples 106-114 and optionally, comprising means for transmitting a beamforming transmission to the initiator device only after the backoff period.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a wireless communication unit to allocate at least one association beamforming training (A-BFT) period, to receive a first Sector Sweep (SSW) transmission from a first responder device during a first A-BFT period, to transmit to said first responder device a SSW feedback transmission in response to said first SSW transmission, and to set a first responder filtering period extending over one or more successive A-BFT periods, wherein said wireless communication unit is to ignore one or more SSW transmissions from said first responder device during said first responder filtering period, the wireless communication unit is to receive a second SSW transmission from a second responder device during a second A-BFT period, and to set a second responder filtering period, said second A-BFT period is successive to said first A-BFT period, and a beginning time of said second responder filtering period is later than a beginning time of said first responder filtering period, said wireless communication unit is to align an end time of said second responder filtering period with an end time of said first responder filtering period.

2. The apparatus of claim 1, wherein said wireless communication unit is to exchange a probe request and a probe response with said first responder device subsequent to said first SSW feedback transmission, and to set said first responder filtering period subsequent to the exchange of said probe request and said probe response.

3. The apparatus of claim 1, wherein said wireless communication unit is to ignore all SSW transmissions from said first responder device during said first responder filtering period.

4. The apparatus of claim 1, wherein said wireless communication unit is to respond to SSW transmissions from said first responder device only after said first responder filtering period.

5. The apparatus of claim 1, wherein said wireless communication unit is to respond to one or more other SSW transmissions from said first responder device during said first responder filtering period.

6. The apparatus of claim 1, wherein said wireless communication unit is to ignore one or more probe requests from said first responder device during said first responder filtering period.

7. The apparatus of claim 1, wherein said wireless communication unit is to respond to probe requests from said first responder device only after said first responder filtering period.

8. The apparatus of claim 1, wherein said wireless communication unit is to truncate said first responder filtering period.

9. The apparatus of claim 1, wherein a duration of said first responder filtering period is longer than a duration of a beacon interval.

10. The apparatus of claim 9, wherein the duration of said first responder filtering period is at least three times longer than the duration of said beacon interval.

11. A product including a non-transitory storage medium having stored thereon instructions that, when executed by a machine, result in:

allocating at least one association beamforming training (A-BFT) period;

receiving a first Sector Sweep (SSW) transmission from a first responder device during a first A-BFT period;

transmitting to said first responder device a SSW feedback transmission in response to said first SSW transmission;

setting a first responder filtering period extending over one or more successive A-BFT periods; and ignoring one or more SSW transmissions from said first responder device during said first responder filtering period, the instructions, when executed, result in receiving a second SSW transmission from a second responder device during a second A-BFT period, and setting a second responder filtering period, said second A-BFT period is successive to said first A-BFT period, and a beginning time of said second responder filtering period is later than a beginning time of said first responder filtering period, said instructions, when executed, result in aligning an end time of said second responder filtering period with an end time of said first responder filtering period.

12. The product of claim 11, wherein said instructions result in exchanging a probe request and a probe response with said first responder device subsequent to said first SSW feedback transmission, and setting said first responder filtering period subsequent to the exchange of said probe request and said probe response.

13. The product of claim 11, wherein said instructions result in responding to SSW transmissions from said first responder device only after said first responder filtering period.

* * * * *